(12) United States Patent
Esaka et al.

(10) Patent No.: US 8,256,126 B2
(45) Date of Patent: Sep. 4, 2012

(54) TOOL HOLDER FOR ADAPTING A TOOL FOR ITS MEASUREMENT AND MEASURING ARRANGEMENT AND METHOD FOR ITS CALIBRATION

(75) Inventors: Shuichi Esaka, Kariya (JP); Shinji Kubo, Takahama (JP); Katsutoshi Fukagawa, Chiryu (JP)

(73) Assignee: NT Tool Corporation, Takahama, Aichi (JP)

( * ) Notice: Subject to any disclaimer, the term of this patent is extended or adjusted under 35 U.S.C. 154(b) by 0 days.

(21) Appl. No.: 12/899,943

(22) Filed: Oct. 7, 2010

(65) Prior Publication Data
US 2011/0083333 A1  Apr. 14, 2011

(30) Foreign Application Priority Data

Oct. 8, 2009 (DE) .................. 10 2009 044 206

(51) Int. Cl.
*G01B 5/00* (2006.01)
(52) U.S. Cl. ........................................... 33/502
(58) Field of Classification Search .............. 33/502, 33/552; 279/89, 93, 904
See application file for complete search history.

(56) References Cited

U.S. PATENT DOCUMENTS

| | | | | |
|---|---|---|---|---|
| 3,533,638 A | * | 10/1970 | Sedgwick | 279/89 |
| 3,730,540 A | * | 5/1973 | King et al. | 279/91 |
| 3,758,125 A | * | 9/1973 | Cornelia | 279/103 |
| 4,228,705 A | * | 10/1980 | Heisner | 82/158 |
| 4,265,460 A | * | 5/1981 | Senzaki | 279/97 |
| 4,786,221 A | * | 11/1988 | March | 409/218 |
| 5,352,074 A | * | 10/1994 | Ishikawa | 409/232 |
| 6,301,007 B1 | | 10/2001 | Hanlon et al. | |
| 7,735,234 B2 | * | 6/2010 | Briggs et al. | 33/561 |
| 2007/0206998 A1 | * | 9/2007 | Zollmann | 409/234 |

FOREIGN PATENT DOCUMENTS

| | | |
|---|---|---|
| DE | 10124275 B4 | 5/2004 |
| DE | 102004018968 A1 | 11/2005 |
| DE | 102006011814 A1 | 9/2007 |
| EP | 1834730 A1 | 1/2007 |
| WO | 03002298 A1 | 1/2003 |

* cited by examiner

*Primary Examiner* — Christopher Fulton
(74) *Attorney, Agent, or Firm* — Mark D. Wieczorek; Mayer & Williams PC

(57) ABSTRACT

The present invention relates to a tool holder for adapting a tool to be measured in a measuring arrangement. Such tool holder can, for example, include a spindle or an adapter of a tool presetter to be inserted in such spindle. Furthermore, this invention refers to a measuring arrangement for measuring of tools as well as a method for calibration of such measuring arrangement to a zero-point of the tool.

19 Claims, 6 Drawing Sheets

TOOL HOLDER FOR ADAPTING A TOOL FOR ITS MEASUREMENT AND MEASURING ARRANGEMENT AND METHOD FOR ITS CALIBRATION

STATEMENT OF RELATED APPLICATIONS

This application claims priority of German Application No. 102009044206.5, filed Oct. 8, 2009, the contents of which are incorporated herein by reference in its entirety.

BACKGROUND

DE 101 24 275 B4 refers to a method and a measuring arrangement for the measurement of tools. The measuring arrangement includes a base plate with an adapting arrangement for adapting a tool that is to be measured and a coordinate slide that is installed at the base plate. The coordinate slide holds the measuring system to be geared towards the tool. The measuring system includes camera systems with connected units for image processing. The solution provided particularly refers to measuring arrangements, where several adapters are used for the position-defined arrangement of the tools in the measuring system to be able to measure several, if applicable, different tools in the measuring arrangement. In each case, the adapters include a basic module and one or multiple insertion modules that are allocated to the basic module. To be able to measure a tool, which is inserted into the measuring arrangement by means of such adapter, it is necessary to establish a definite relationship between the measurement coordinate system of the measuring device and a tool-specific tool coordinate system. The tool coordinate system shows a so-called logical zero-point, which cannot be recognized from the outside. Therefore, at the insertion modules there is in each case an auxiliary zero-point that is also known as a gauging edge (actually, a calibration edge). The auxiliary zero-point is defined by auxiliary coordinates that on the one hand indicate the radial displacement between the auxiliary zero-point and the rotation axis and on the other hand the axial displacement between the auxiliary zero-point and the logical zero-point. The technical design of the gauging edge or auxiliary zero-point is not specified, but is only shown in the drawing by a crosslines symbol.

DE 10 2004 018 968 A1 also refers to the measuring arrangement for measuring of tools as shown in DE 101 24 275 B4. It is proposed to read out the auxiliary coordinates as module information from a two-dimensionally-structured optically ascertainable medium.

DE 10 2006 011 814 A1 refers to a tool measurement device for measuring a tool in a tool holder. The tool holder has a logical zero-point, which is termed a holder point. The tool holder also has an auxiliary zero-point, which is termed a measuring point. The measuring point is established by two spheres that are fixed in two metallic cavities of the tool holder that are arranged horizontally and vertically displaced to each other. This measuring point is used for the calibration of the tool measuring device on the used tool holder and is also termed a calibration feature.

FIG. 1 shows a calibration feature according to the state of the art in detail view. In particular, the figure shows a calibration feature as in DE 10 2006 011 814 A1. The calibration feature is arranged at an upper outside edge of a tool holder 01. The tool holder 01 can, for example, include a spindle or an adapter installed on a spindle. The calibration feature includes a first sphere 02 and a second sphere 03, both of the same type. The first sphere 02 is arranged in a first cylindrical opening 04 in the tool holder 01. The second sphere 03 is arranged in a second cylindrical opening 06 in the tool holder 01 and is pressed against the first sphere 02 by a spring 07, so that the first sphere 02 and the second sphere 03 contact in a contact point 08. Glue is put between spheres 02 and 03 and optionally also in the cylindrical openings 04, 06 for permanent fixation of the spheres.

The second sphere 03 is arranged displaced to the first sphere 02. The horizontal displacement and the vertical displacement of the center of the second sphere 03, compared to the center of the first sphere 02, respectively depends on the radius of both spheres 02, 03. Thus, a virtual connecting line between the central points of both of the spheres 02, 03 inclines at an angle of 45° compared to the horizontal and at an angle of 45° compared to the vertical.

Only one part of the surface of both of the spheres 02, 03 form a segment of the external surface of the calibration feature, since both of the spheres 02, 03 are embedded in both of the openings 04, 06. Each of the spheres 02, 03 is embedded in the openings 04, 06 to that extent that only 25% of the spheres' circumference is available for the image recording. Also the used glue 05 narrows the optically accessible contour of the circle.

The calibration feature is designed for optical registration, and in particular a first circular arched outside edge 09 of the first sphere 02 and a second circular arched outside sphere 11 of the second sphere 03 serve for optical registration. Thus, in particular only those parts of the circular arched outside edges 09, 11 can be recognized that form an outside contour of the calibration feature. The outside edges of the spheres 02, 03 each range from near the transition to both of the openings 04, 06 in the tool holder 01 to near the contact point 08 between the spheres 02, 03. Thus, the angle at the central point of the contour-forming circular arched outside edges 09, 11 in each case is about 95° only. Because of the limited central angle, the position of the spheres 02, 03 is optically ascertainable only to a limited extent. The contour-forming outside edges 09, 11 that are to be ascertained are arranged in different distances to the optical axis of an optical measuring system for the optical identification of the calibration feature and thus they underlie different errors in the optical imaging. These optical errors can only be corrected to a limited extent and do therefore influence the measurement of the calibration feature negatively.

The calibration feature formed by the spheres 02, 03 has areas that are difficult to access in the range of its common contact point 08 as well as at the transitions to the tool holder 01 that are prone to dirt and cannot be easily cleaned. The remaining dirt leads to uncertainties in the optical identification of the calibration feature.

For establishing the calibration feature, the openings 04, 06 and the spheres 02, 03 have to be exactly arranged to each other, thus the establishment of the calibration feature is complex and the calibration feature is prone to damage.

SUMMARY OF THE INVENTION

Based on the state of the art, it is an object of the invention to provide a tool holder for adapting a tool that is to be measured in a measuring arrangement, which allows a more precise calibration of the measuring arrangement on the tool holder by means of an improved calibration feature. Furthermore, such measuring arrangement and an adequate method for its calibration are provided.

The tool holder according to the invention allows the adaption of a tool that is to be measured in a measuring arrangement. The measuring arrangement is preferably about a tool presetter, in which cutting tools like drilling and milling tools can be measured. The tool holder can, for example, be about a spindle or an adapter that is to be inserted in such spindle. Initially, the tool holder includes a cylindrically-symmetric fixable base body, whose axis of symmetry defines a vertical axis of the tool holder. In the usual embodiments of measuring arrangements for the measurement of tools, the symmetry axis of the base body of the tool holder in the measuring arrangement is arranged vertically, whereas the tool holder is temporarily rotated around the symmetry axis during the measurement. Thus, the directions vertical and horizontal are consecutively to be understood in reference to such usual measuring arrangements. When the tool holder is used in connection with special embodiments of measuring arrangements, in which, for example, the tool holder is mounted being inclined with regard to the symmetry axis of its base body, the directions vertical and horizontal are to be understood in reference to the inclined mounting.

A zero-point of the tool, which forms a point of reference, is defined in the tool holder. In each case, such zero-points of the tool form the point of origin of the tool coordinate system and are used, for example, to indicate geometrical positioning data of cutting tools, e.g., indicating the position of a blade. Usually, the zero-point of the tool is inside the tool and the tool holder respectively and is therefore not visible from the outside and thus not optically measurable. Usually, the zero-point of the tool lies on the symmetry axis of the tool holder. Furthermore, the tool holder includes a calibration feature that is recognizable from the outside, which has a horizontal distance and a vertical distance to the zero-point of the tool. The calibration feature is used for the calibration of the measuring arrangement indirectly to the zero-point of the tool. For this purpose, the horizontal distance and the vertical distance of the calibration feature to the zero-point of the tool must be known before the calibration. In that way, the horizontal distance and the vertical distance are indicated by the producer of such tool holders, for example, on a type plate on the tool holder.

The calibration feature has a circular arched contour-forming outside edge, whose central angle is greater than 135°. Thus, the calibration feature is recognizable by means of its circular arched contour-forming outside edge from a viewing direction that is perpendicular to the horizontal distance and perpendicular to the vertical distance, so that, in this perspective, the vertical and the horizontal distance of the calibration feature from the zero-point of the tool are measurable. In contrast to the state of the art, the central angle of the circular arc form of the contour-forming outside edge is not only 90° or nearly 135°, but greater than 135°, that is more than ¾ of a straight angle. Therefore, the central point of the circular arch form can be determined considerably more exactly than in the current state of the art, such that the vertical distance and the horizontal distance of the calibration feature towards the zero-point of the tool can be recognized and measured with increased certainty and accuracy. The increased angle at the central point of the circular arched contour-forming outside edge is simply realizable by the fact that the calibration feature is established by exactly one single sphere. However, other geometrical forms like ellipsoid forms, resulting in a circular arched contour-forming outside edge having an angle at the central point greater than 135°, can be used. In contrast to the state of the art, a second sphere is not necessary.

A specific advantage of the specified tool holder is that the simplified and, with regard to the optical scanning, at the same time improved calibration feature, allows an increased accuracy in calibrating a measuring arrangement on the tool holder, and thus it enables an increased accuracy in the measurement of a tool that is to be inserted in the tool holder.

The circular arch form of the contour-forming outside edge preferably cuts a straight line that includes the horizontal radius of the circular arch form in a first intersection point and a straight line comprising a vertical radius of the circular arch form in a second intersection point. Thus, the circular arch form of the contour-forming outside edge has a horizontal and a vertical tangent. Thus, it is ensured that the central point of the circular arch form and thus the position of the calibration feature can be established especially exactly with regard to the vertical distance and at the same time especially exactly with regard to the horizontal distance to the zero-point of the tool. However, the circular arch form of the contour-forming outside edge can also have another orientation towards the tool holder.

Preferably, the circular arch form of the contour-forming outside edge is formed by a semicircle or an almost complete semicircle. Thus, the central angle is preferably 180° or almost 180°, for example at least 170°. The symmetry axis of the semicircle, in which also lies the radius belonging to the central point of the outline of the semicircular arch, is each inclined at least 10° towards the horizontal radius and towards the vertical radius, so that it is ensured that both coordinates of the central point of the semicircle can be established extra exactly. Especially preferable is an inclination of the semicircle form of 45° towards the horizontal radius and towards the vertical radius, so that in horizontal and in vertical direction the same degree of accuracy is achieved.

As especially preferred, the calibration feature is formed by a sphere of which one half is inserted in a surface of the tool holder. This surface is preferably inclined 45° towards the horizontal radius of the circular arch form. Thus, the inclination of the surface is 45° as well towards the vertical radius of the circular arch form. In this embodiment of the tool holder, one half of the sphere's surface forms an outside surface of the calibration feature. During an optical recording of the sphere, it is to be recognized by the semicircular arched contour-forming outside edge. The semicircle has a symmetry axis which is inclined 45° towards the horizontal and 45° towards the vertical.

Preferably, the sphere is fixedly connected with a pin that is arranged coaxially towards the sphere being inserted in a cylindrical opening of the tool holder. In that way, a constant seat of the sphere in the tool holder is ensured.

Preferably, the sphere is made of a ruby which constantly keeps its form. Also preferably, the sphere can be made of ceramic, carbide or steel. It is important that there is almost no form deviation of the sphere.

The measuring arrangement according to the invention can be used for the measurement of tools, preferably within a tool presetter, in which cutting tools like drilling or milling tools can be measured. Initially, the measuring arrangement includes a tool holder according to the invention for adapting the tool that is to be measured.

The tool holder is fixed in the measuring arrangement with its base body, for example within a rotatable spindle. The tool holder is fixed in such way that it can rotate around the symmetry axis of its base body. Furthermore, the measuring arrangement includes an optical measuring device for measuring the tool to be adapted by the tool holder. The optical measuring device can, for example, include a moveable camera, whose output signal is analyzed by a programmable processor by means of methods for image processing. The optical measuring device qualifies, for example, to measure the blade of a cutting tool.

The method according to the invention in part is directed towards the calibration of a measuring arrangement according to the invention on the zero-point of a tool. Initially, the method includes a step in which a predefined horizontal standard calibration measure is captured, which represents the horizontal distance of the calibration feature from the zero-point of the tool. Similarly, a predefined vertical standard calibration measure is captured which represents the vertical distance of the calibration feature from the zero-point of the tool. However, the horizontal and the vertical standard calibration measure can depend on other variables as well.

In many cases, the horizontal and the vertical standard calibration measure are known, for example by the fact that they can be read off from a type plate on the tool holder formed by a spindle or an adapter. In such case, for the method, the horizontal and the vertical standard calibration measure are to be read off and to be kept ready for the further steps, for example, by entering them into a processor of the measuring arrangement. The recordation of the horizontal and the vertical standard calibration measure can also be automated, for example, by reading out of an optically recordable medium, in which the horizontal and the vertical standard calibration measure are stored.

In a further step of the method, the optical measuring device is to be directed to the calibration feature. This can be realized, for example, by arranging a camera in such a way that the calibration feature is in the focus of the camera. In that way, an optical axis of the camera is arranged perpendicularly to the horizontal distance and perpendicularly to the vertical distance of the calibration feature of the zero-point of the tool. In a further step of the method, an exact adjustment of the optical measuring device is carried out in such a way that an optical axis of the optical measuring device is directed to the central point of the circular arch form of the outside edge of the calibration feature. Hence, the central point of the circular arch form of the contour-forming outside edge of the calibration feature lies on the optical axis of the measuring device.

In a further step, a horizontal position and a vertical position of the central point of the circular arch form of the calibration feature are calculated from the measured values of the optically-detected outside edge of the calibration feature. For this purpose, adequate methods of image processing are to be used, which are known to the person skilled in the art.

In a further step of the method, a point of origin representing the zero-point of the tool is calculated. For this purpose, on the one hand a difference between the horizontal position of the central point of the circular arch form of the calibration feature and the horizontal standard calibration measure is to be calculated. On the other hand, a difference between the vertical position of the central point of the circular arch form of the calibration feature and the vertical standard calibration measure is to be calculated.

As a result of the specified method, a point of origin is available which is suitable as a reference point for measuring the tool. It is guaranteed by the method that this point of origin represents the zero-point of the tool to a high degree of accuracy, which is suitable as a reference point for the geometrical specification of the tool. The method allows an exchange of the tool holder without entailing limited accuracy in the measurement of a tool, which would generally be expected.

It is a specific advantage of the specified method for calibration of a measuring arrangement according to the invention that the optical axis of the optical measuring device is directed towards the central point of the circularity, such that the circular arch form of the outside edge of the calibration feature can be recorded with a high degree of accuracy. Aberrations depending on the distance to the central point of the image are flattened through this.

In a preferred embodiment, the method furthermore includes steps for checking the plausibility of the predefined horizontal standard calibration measure and the predefined vertical standard calibration measure. This embodiment is especially suitable for the calibration of measuring arrangements in which the tool holder is formed by an adapter which is carried by a spindle. The spindle also has a calibration feature so that the zero-point of the tool can also be established by means of this calibration feature. Initially, for the realization of this embodiment of the method according to the invention, the zero-point of the tool determinable in that way is to be established. For this purpose, for example, the method according to the invention can be carried out. Alternatively, a calibration feature according to the state of the art can be used. In many applications, the zero-point of the tool determinable in that way does not change, since the spindle is fixedly installed. Thus, it can be reverted to data stored for the zero-point of the tool. For checking the zero-point of the tool with regard to plausibility, the differences between the coordinates of the zero-point, established based on the calibration feature of the spindle, and the coordinates of the zero-point based on the calibration feature of the adapter are calculated. In case that one of the differences exceeds a predefined allowed tolerance range, a message is put out signalling an error. Alternatively or additionally, a message is put out if none of the differences exceeds the predefined allowed range, to signal that the adapter is fixed in the spindle correctly. An error can arise, for example, if there is swarf or dust between the adapter and the spindle when inserting the adapter into the spindle. Furthermore, an error can be caused when the predefined horizontal and vertical standard calibration measures were not recorded correctly. In this embodiment of the method, follow-up costs that arise from erroneous calibration are avoided.

A further preferred embodiment of the method furthermore includes steps for checking the correctness of the calibration of the measuring arrangement. In this embodiment of the method, one or multiple further geometrical characteristics of the calibration feature are chosen initially. The properties of these characteristics are known. The geometrical characteristics can, for example, be about a geometrical form whose properties are known. In a further step, the properties of the chosen characteristics of the calibration feature are measured. The measured properties are compared to the known properties of these characteristics. A notification is given if the measured property of at least one of the characteristics differs from the known property of the appropriate characteristic at least in more than a predefined allowed range. This embodiment of the method allows, for example, to recognize dirt and deformation of the calibration feature and to avoid errors resulting from this. It is checked whether the recognized calibration feature complies with the expected calibration feature or whether the tool holder was confounded. The predefined allowed dimension can, for example, be adjustable by means of application software. It is a specific advantage of this embodiment of the method that follow-up costs that can arise by erroneous calibration or by usage of a wrong adapter are avoided. The user of the measuring arrangement is advised that there is an error.

A further embodiment of the method includes supplemental steps that are carried out during the measurement of a tool and assist in the measuring accuracy and thus are beneficial for the aim of the calibration. These steps include checking the rotation speed of an adapter forming the tool holder, particularly if the adapter is rotated by manual rotation of a spindle carrying the adapter. In this embodiment, the rotation speed is measured permanently, while the spindle is rotated. A message is put out if the measured rotation speed exceeds a predefined value for a maximum allowable rotation speed.

The data measured, in case of incorrect rotation speed, are separated and can be recorded anew. In this embodiment of the method, data having a too great measurement uncertainty due to a too fast rotation of the tool are avoided. The user, who manually rotates the spindle, does not need to rotate the spindle unnecessarily slowly, so that the testing period is minimized without limiting the accuracy of the measurement.

A further embodiment of the method includes supplemental steps that guarantee a high degree of accuracy during the measurement of a tool. This embodiment of the method is also particularly designated for measuring arrangements in which the tool holder is formed by an adapter that is carried by a rotatable spindle. During the measurement of the tool, the rotational position of the spindle is measured permanently, particularly while the spindle is rotated manually. During the measurement of the tool, the spindle and the carried adapter are manually rotated from a first rotational position to a second rotational position. Such rotation is, for example, necessary if different blades of a milling tool are to be measured. The permanent measurement of the rotational position can, for example, be carried out by means of a rotary encoder which is connected to the rotational axis of the spindle. As soon as the spindle resumes the first rotational position, the spindle and the carried adapter are manually rotated from the second rotational position towards the first rotational position. A message is put out when the first rotational position is measured once more. For this purpose, the rotational positions can be stored, for example. Alternatively, the rotational position can permanently be displayed in numeric form, so that the user can learn the rotational position from the message forming the numeric output. By means of this embodiment of the method, it is possible to again adjust an already-determined rotational position with the feature to be checked has maximum defection after a manual rotation of the spindle. Such rotational positions are adjusted, since the measurements are based on the presumption that valid data are measured in case of a maximum deflection of the feature to be checked. However, it can appear that, for example, in case of changing the rotational direction before achieving the maximum, an incorrect maximum is measured, which could cause considerable measuring errors. Furthermore, it can occur that not all the maxima representing, for example, several blades of a drilling tool, are measured due to a too-fast rotation of the spindle. For repeating the measurement, the rotational positions, in which the maxima occur, have to be adjusted exactly. By means of the described embodiment of the method, it is possible to again exactly adjust the rotational position for which a maximum had been measured. Furthermore, by recording the continuous rotational position and analyzing the rotational direction, it can be avoided that the measurement is based on a non-existing or erroneous maximum due to an inadvertent change of the rotational direction.

BRIEF DESCRIPTION OF THE DRAWINGS

With reference to the drawing, both a calibration feature according to the state of the art as well as preferred embodiments of the invention are described consecutively. It is shown by.

DETAILED DESCRIPTION

Figure 1:
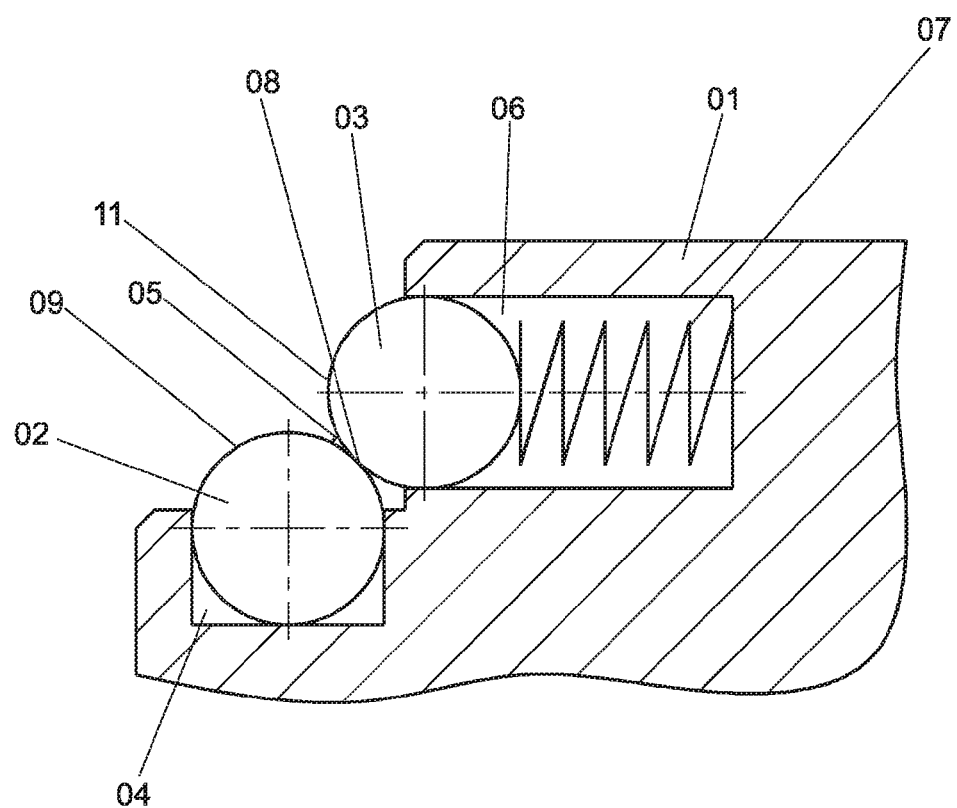
FIG. 1: a calibration feature with two spheres according to the state of the art.

FIG. 1 shows a calibration feature with two spheres according to the state of the art, which is discussed above.

Figure 2:
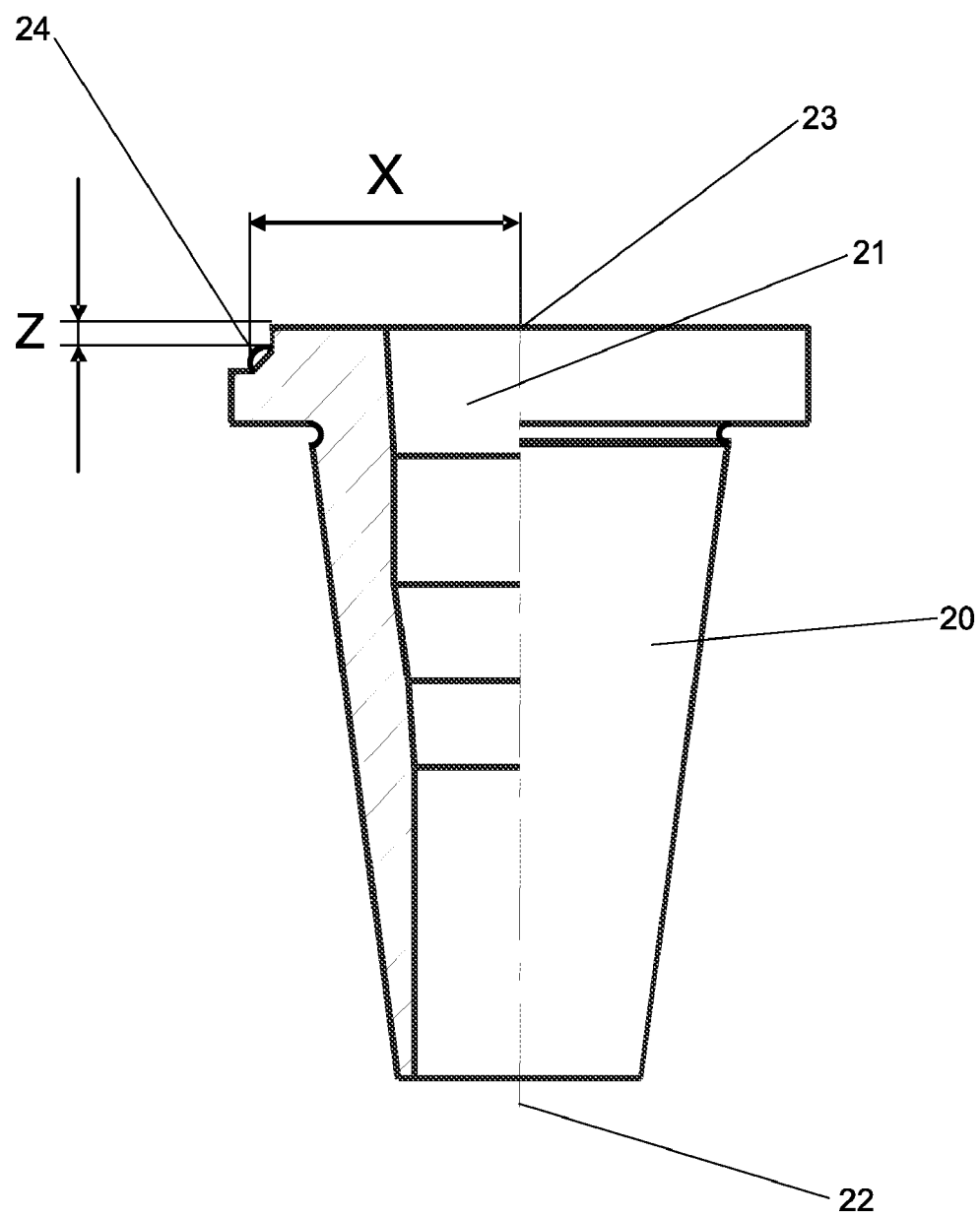
FIG. 2: a preferred embodiment of the tool holder according to the invention in the form of an adapter.

FIG. 2 shows a preferred embodiment of a tool holder according to the invention in the form of an adapter. The adapter is designated for being fixed in a rotatable spindle of a tool presetter (not shown) and to adapt a tool that is to be measured. Initially, the adapter includes a cylindrically symmetric base body 20 that is to be fixed in the spindle by its outer surface. The base body does not necessarily need to be cylindrically symmetric, but can, for example, be formed as a triangular shape of constant width.

The cylindrically-symmetric base body 20 has an inner cavity 21 which is also formed to be cylindrically symmetric and serves the adaption of the tool that is to be measured. A symmetry axis 22 of the cylindrically-symmetric base body 20 is design to form a rotational axis around which the adapter, the spindle and the tool to be measured will rotate in order to measure the tool. The symmetry axis 22 of the cylindrically-symmetric base body 20 is usually arranged vertically in the measuring arrangement.

Relating to the adapter, a zero-point 23 of the tool is defined which forms a point of reference for the tool to be carried. The zero-point 23 of the tool forms the point of origin of a tool coordinate system. The zero-point 23 of the tool lies on the symmetry axis 22 on a defined level, for example, at the upper boundary of the adapter. In other embodiments, the level of the zero-point of the tool is defined by the tool adapter.

Furthermore, the adapter includes a calibration feature 24 with a horizontal distance X to the zero-point 23 of the tool and a vertical distance Z to the zero-point 23 of the tool.

Figure 3:
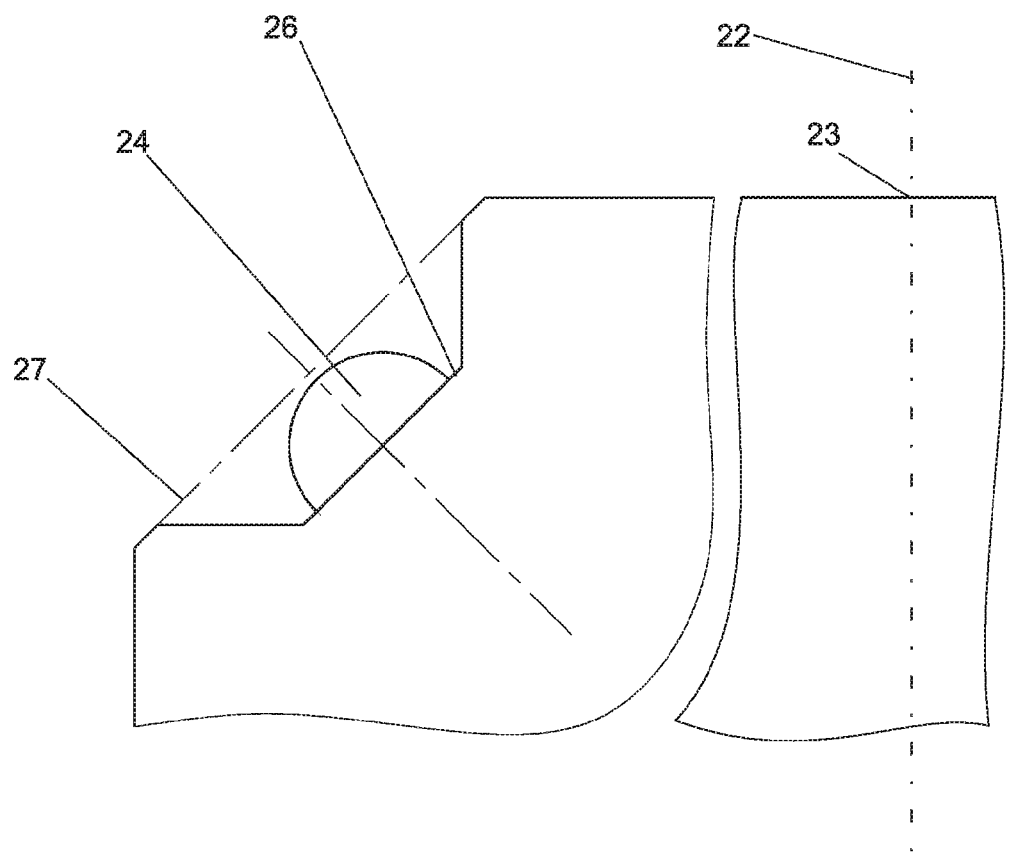
FIG. 3: a calibration feature as shown in FIG. 2 in detail view.

FIG. 3 shows the calibration feature 24 shown in FIG. 2 in detail view. The calibration feature 24 is formed by a sphere made of a ruby. The sphere 24 is adjusted with one half into a surface 26 of the adapter which is inclined 45° towards the symmetry axis 22 (shown in FIG. 2). At the same time, the surface 26 is also inclined 45° towards the horizontal. Incidentally, the inclined surface 26 is directed with its outer surface against the symmetry axis 22 and towards the tool to be fixed.

The inclined surface 26 and the sphere 24 are adjusted within a deepening of a beveling 27 of the adapter, such that the sphere 24 is protected, for example, against rough mechanical influences. Nevertheless, the sphere 24 and the surrounding area can easily be cleaned.

Figure 4:
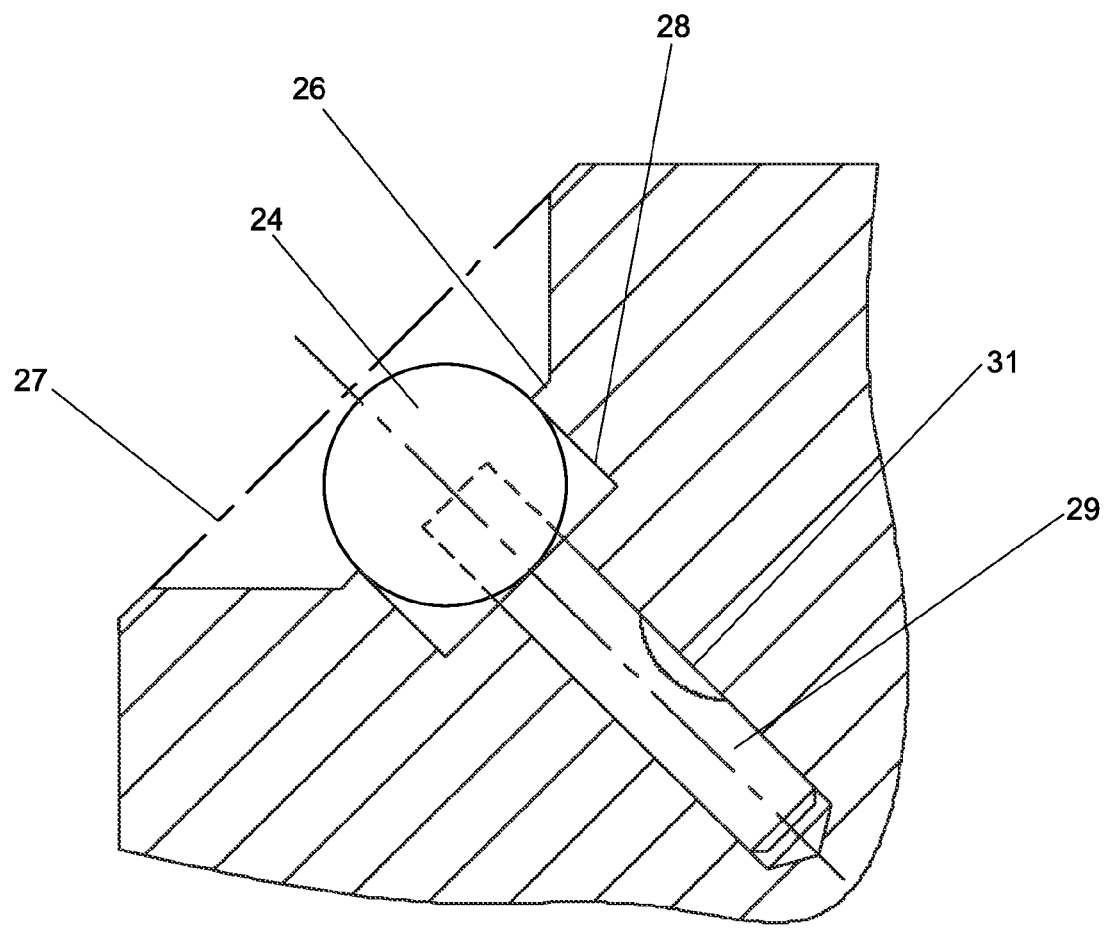
FIG. 4: the calibration feature shown in FIG. 3 in sectional view.

FIG. 4 shows the calibration feature 24 shown in FIG. 3 in a sectional view. The sphere 24 lies in a cylindrical opening 28 in the adapter. The sphere 24 is permanently fixed with a mounting pin 29 which is inserted into the inside of the sphere 24 hereto. The central point of the sphere 24 is adjusted on the symmetry axis of the cylindrical mounting pin 29. The mounting pin 29 is permanently fixed in a cylindrical opening 31 in the adapter and ensures that the sphere 24 cannot fall out of the opening 28. The mounting pin 29 is made of steel and can, for example, be fixed by being clamped or pasted in the opening 31. Alternatively, the sphere 24 can also be fixed at the opening 28 without a pin.

Figure 5:
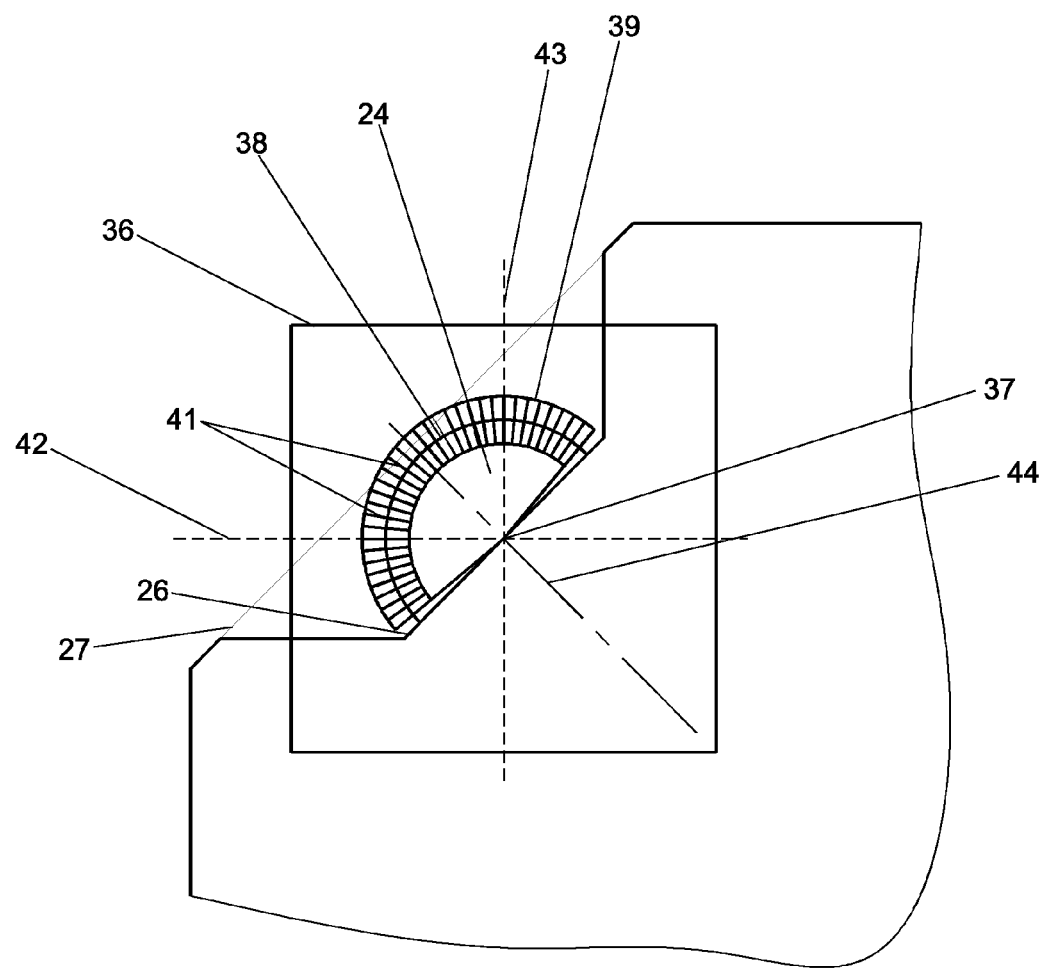
FIG. 5: the calibration feature shown in FIG. 3 with characteristics of image processing.

FIG. 5 shows the calibration feature shown in FIG. 3 with the characteristics for the image processing to determine the position of the sphere 24 by means of optical measuring methods within the measuring arrangement. A frame 36 identifies the image section to be used for the image recognition.

The camera is adjusted in such a way that the recorded picture includes the frame 36. In a central point 37 of the frame 36, which forms the center of the image and lies on the optical axis of the camera, as a result of the adjustment, a central point of a semicircle 38 is arranged. The semicircle 28 forms the image of the visible contour of the sphere 24. An area 39 which is interesting for the image recognition, which is also termed Area of Interest, has the form of a circular arch ring having a central angle of 170°. Furthermore, search lines 41 are indicated along which the semicircle 38 is searched at the image recognition.

The semicircle 38 that forms the contour-forming outside edge of the sphere 24 cuts a line 42 including a horizontal radius of the semicircle 38 and cuts a line 43 including a vertical radius of the semicircle 38. A symmetry axis 44 of the semicircle 38 is respectively inclined 45° towards the horizontal radius and the vertical radius. Thus, the central point of the semicircle 38 can be determined with the same degree of accuracy with regard to the horizontal direction and with regard to the vertical direction.

Figure 6:
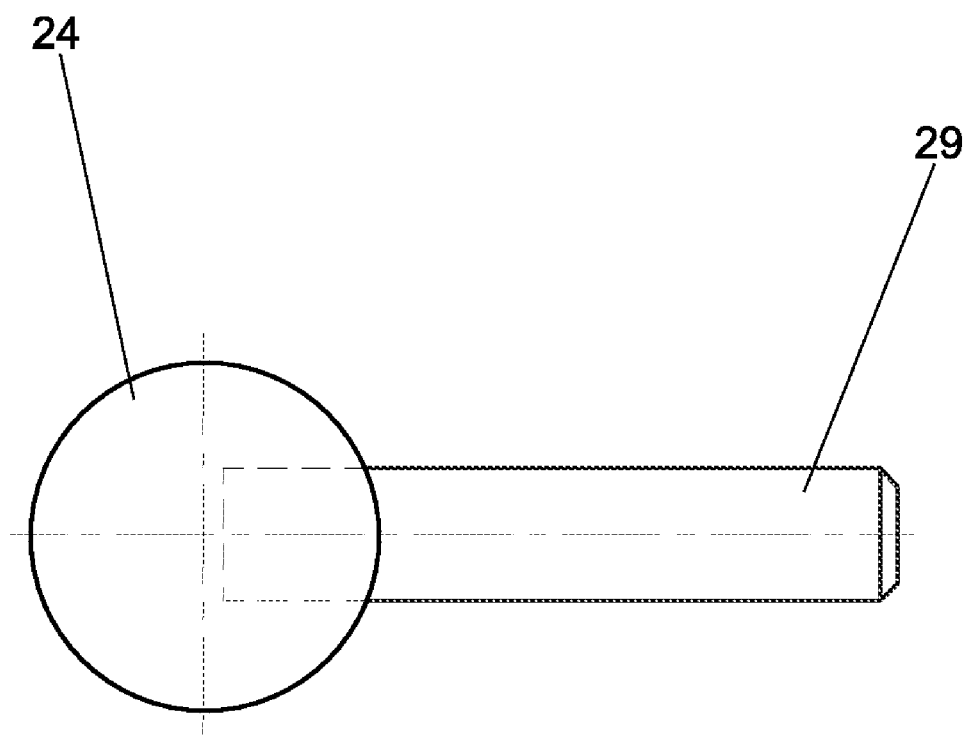
FIG. 6: a sphere shown in FIG. 4 in detail view.

FIG. 6 shows the sphere shown in FIG. 4 with the mounting pin 29. The sphere 24 has a diameter of 4 mm. The mounting pin 29 has a diameter of 1.5 mm. The length of the arrangement consisting of the sphere 24 and the mounting pin 29 is 10 mm.

The invention claimed is:

1. A tool holder for adapting a tool that is to be measured in a measuring arrangement, comprising:
   a fixable base body, having a symmetry axis that defines a vertical axis of a tool holder, and wherein the tool holder has further defined thereon a zero-point of the tool to be mounted in the tool holder; and
   a calibration feature which has a horizontal distance and a vertical distance to the zero-point of the tool;
   such that the calibration feature has a circular arch form contour-forming outside edge which is located in a vertical plane, which vertical plane includes the zero-point of the tool, and wherein a central angle of the circular arch form contour-forming outside edge is greater than 135°.

2. The tool holder according to claim 1, such that the circular arch form contour-forming outside edge cuts a line including a horizontal radius of the circular arch form contour-forming outside edge at a first intersection point and a line including a vertical radius of the circular arch form contour-forming outside edge at a second intersection point.

3. The tool holder according to claim 2, such that that the circular arch form contour-forming outside edge is formed by a semicircle, whose symmetry axis is inclined respectively at least 10° towards the horizontal radius and towards the vertical radius.

4. The tool holder according to claim 3, such that the calibration feature is formed by a sphere, one half of which is inserted into a surface of the tool holder, that surface being inclined 45° towards a horizontal radius of the circular arch form contour-forming outside edge.

5. A measuring arrangement for measuring of tools, comprising:
   a tool holder according to claim 4, the tool holder being fixed by its base body in a measuring arrangement, such that a rotation of the tool holder around its symmetry axis is allowed; and
   an optical measuring device for measuring of tools to be inserted into the tool holder.

6. A measuring arrangement for measuring of tools, comprising:
   a tool holder according to claim 2, the tool holder being fixed by its base body in a measuring arrangement, such that a rotation of the tool holder around its symmetry axis is allowed; and
   an optical measuring device for measuring of tools to be inserted into the tool holder.

7. A measuring arrangement for measuring of tools, comprising:
   a tool holder according to claim 3, the tool holder being fixed by its base body in a measuring arrangement, such that a rotation of the tool holder around its symmetry axis is allowed; and
   an optical measuring device for measuring of tools to be inserted into the tool holder.

8. A measuring arrangement for measuring of tools, comprising:
   a tool holder according to claim 1, the tool holder being fixed by its base body in a measuring arrangement, such that a rotation of the tool holder around its symmetry axis is allowed; and
   an optical measuring device for measuring of tools to be inserted into the tool holder.

9. A method for calibration of a measuring arrangement according to claim 8 to the zero-point of the tool, comprising:
   capturing a predefined horizontal standard calibration measure, the predefined horizontal standard calibration measure representing the horizontal distance of the calibration feature from the zero-point of the tool;
   capturing a predefined vertical standard calibration measure, the predefined vertical standard calibration measure representing the vertical distance of the calibration feature from the zero-point of the tool;
   directing the optical measuring device to the calibration feature;
   directing an optical axis of the optical measuring device to a central point of the circular arch form contour-forming outside edge of the calibration feature;
   calculating a horizontal position and a vertical position of the central point of the circular arch form contour-forming outside edge of the calibration feature based on data from the optically recognized circular arch form contour-forming outside edge;
   calculating a point of origin representing a zero-point of the tool by calculating a difference between the horizontal position of the central point of the circular arch form contour-forming outside edge of the calibration feature and the horizontal standard calibration measure as well as a difference between the vertical position of the central point of the circular arch form contour-forming outside edge of the calibration feature and the vertical standard calibration measure.

10. A method according to claim 9, further comprising the following steps for checking the plausibility of the predefined horizontal standard calibration measure and the predefined vertical standard calibration measure of an adapter forming the tool holder:
    establishing a zero-point of the tool by calibrating on a calibration feature of a spindle carrying an adapter;
    calculating a plurality of differences between the coordinates of the zero-point of the tool based on the calibration feature of the spindle and the coordinates of the established zero-point of the tool based on the calibration feature of the adapter;
    outputting a message in the case where one of the differences exceeds a predefined range.

11. A method according to claim 10, further comprising the following steps for checking the accuracy of the calibration of the measuring arrangement:
- selecting one or multiple further geometrical characteristics of the calibration feature, whose properties are known;
- measuring the properties of the chosen characteristics of the calibration feature;
- comparing the measured properties with a set of known properties of the characteristics, outputting a message in the case where the measured property of at least one of the characteristics differs from the known property of the respective characteristic by more than a predefined allowed range.

12. A method according to claim 10, further comprising the following steps for checking the rotation speed of an adapter forming the tool holder:
- measuring a rotation speed of a manually-rotated spindle carrying an adapter;
- outputting a message in the case where measured rotation speed exceeds a predefined range for a maximum allowed rotation speed.

13. A method according to claim 10, further comprising the following steps for determining a rotational position of an adapter forming the tool holder:
- permanently measuring the rotational position of a spindle carrying an adapter;
- manually rotating the spindle and the adapter mounted therein from a first rotational position to a second rotational position;
- manually rotating the spindle and the adapter mounted therein from the second rotational position towards the first rotational position;
- outputting a message in the case where the first rotational position is measured again.

14. A method according to claim 9, further comprising the following steps for checking the accuracy of the calibration of the measuring arrangement:
- selecting one or multiple further geometrical characteristics of the calibration feature, whose properties are known;
- measuring the properties of the chosen characteristics of the calibration feature;
- comparing the measured properties with a set of known properties of the characteristics, outputting a message in the case where the measured property of at least one of the characteristics differs from the known property of the respective characteristic by more than a predefined allowed range.

15. A method according to claim 14, further comprising the following steps for checking the rotation speed of an adapter forming the tool holder:
- measuring a rotation speed of a manually-rotated spindle carrying an adapter;
- outputting a message in the case where measured rotation speed exceeds a predefined range for a maximum allowed rotation speed.

16. A method according to claim 14, further comprising the following steps for determining a rotational position of an adapter forming the tool holder:
- permanently measuring the rotational position of a spindle carrying an adapter;
- manually rotating the spindle and the adapter mounted therein from a first rotational position to a second rotational position;
- manually rotating the spindle and the adapter mounted therein from the second rotational position towards the first rotational position
- outputting a message in the case where the first rotational position is measured again.

17. A method according to claim 9, further comprising the following steps for checking the rotation speed of an adapter forming the tool holder:
- measuring a rotation speed of a manually-rotated spindle carrying an adapter;
- outputting a message in the case where measured rotation speed exceeds a predefined range for a maximum allowed rotation speed.

18. A method according to claim 17, further comprising the following steps for determining a rotational position of an adapter forming the tool holder:
- permanently measuring the rotational position of a spindle carrying an adapter;
- manually rotating the spindle and the adapter mounted therein from a first rotational position to a second rotational position;
- manually rotating the spindle and the adapter mounted therein from the second rotational position towards the first rotational position;
- outputting a message in the case where the first rotational position is measured again.

19. A method according to claim 9, further comprising the following steps for determining a rotational position of an adapter forming the tool holder:
- permanently measuring the rotational position of a spindle carrying an adapter;
- manually rotating the spindle and the adapter mounted therein from a first rotational position to a second rotational position;
- manually rotating the spindle and the adapter mounted therein from the second rotational position towards the first rotational position;
- outputting a message in the case where the first rotational position is measured again.

* * * * *